United States Patent [19]

Dickens

[11] Patent Number: 4,630,139
[45] Date of Patent: Dec. 16, 1986

[54] DATA SYNCHRONIZATION

[75] Inventor: John D. Dickens, Melbourne, Australia

[73] Assignee: The Commonwealth of Australia, Australia

[21] Appl. No.: 795,320

[22] Filed: Nov. 6, 1985

Related U.S. Application Data

[63] Continuation-in-part of Ser. No. 573,921, Jan. 12, 1984, abandoned.

[51] Int. Cl.$^4$ .............................................. G11B 5/09
[52] U.S. Cl. ......................................... 360/46; 360/51
[58] Field of Search ............................. 360/51, 46, 27

Primary Examiner—Vincent P. Canney
Attorney, Agent, or Firm—Roylance, Abrams, Berdo & Goodman

[57] ABSTRACT

The data synchronizer overcomes problems with mismatched recording and analyzing equipment and can be used for multiple channel recording. By preliminary analysis a reference point is located on the record signal and used to trigger the data processor. Each channel of the recorder is then played into the data processor using the data synchronizer to provide a triggering signal for the data processor. Each channel is thus able to be analyzed from the same time reference. The data synchronizer decodes the recorded three level digital signal during playback and provides an output synchronizing pulse to externally trigger the computer system. This pulse occurs at the same instant relative to the data recorded each time the tape is played back, regardless of the playback speed.

14 Claims, 8 Drawing Figures

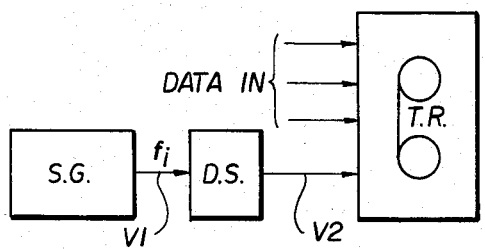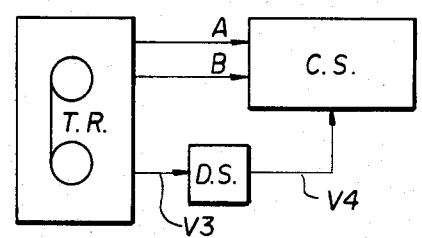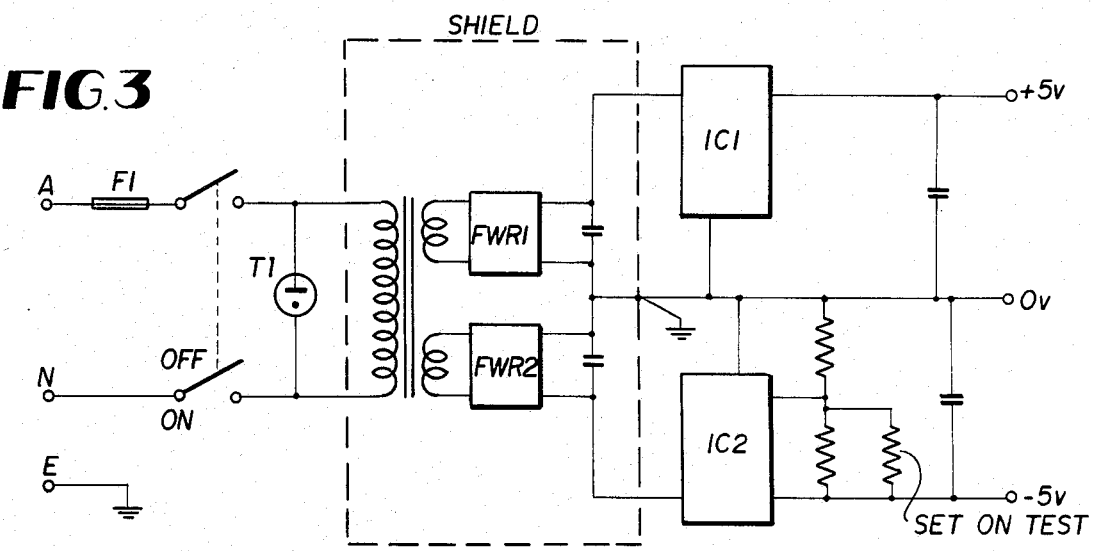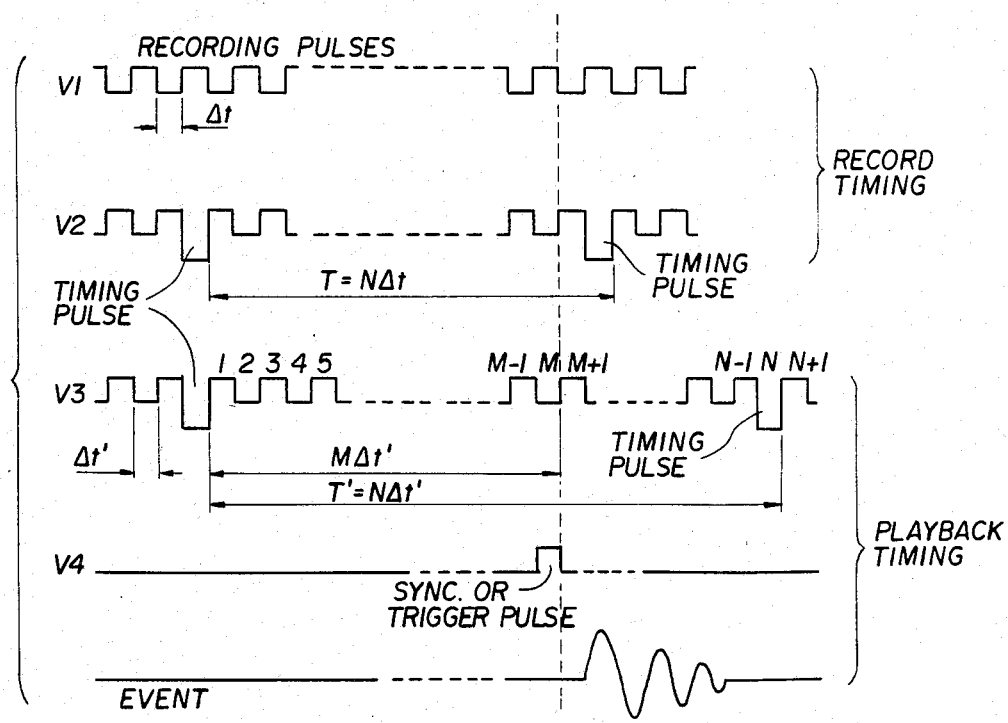

FIG.6
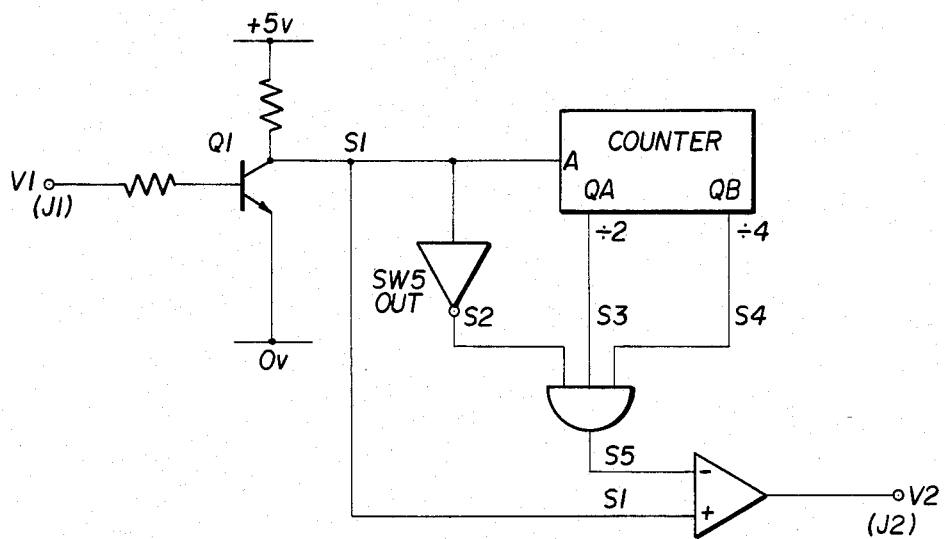
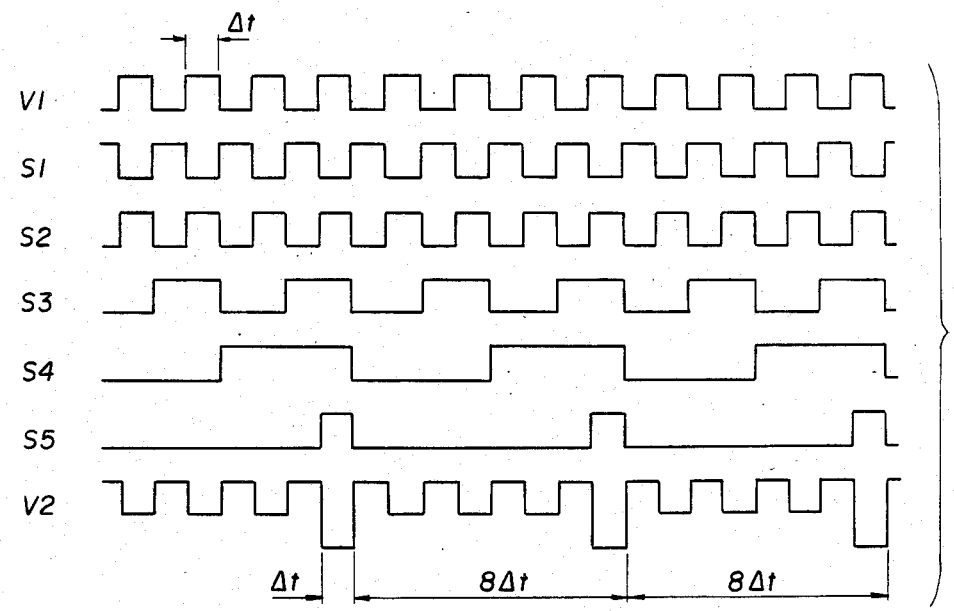
FIG.7

DATA SYNCHRONIZATION

REFERENCE TO RELATED APPLICATION

This application is a continuation-in-part of my co-pending application Ser. No. 573,921 filed Jan. 12, 1984 (now abandoned), and incorporates by reference the entire disclosure thereof.

FIELD OF THE INVENTION

This invention relates to synchronizaton of data for analysis where the data has been recorded on a number of channels and is to be analyzed on a fewer number of channels.

BACKGROUND OF THE INVENTION

Where recording equipment and data analysis equipment are mismatched, as with a multi-channel tape recording unit providing data to a single or dual channel input computer an effective means of comparing input signals occurring at the same time on different channels is difficult. To match the equipment by having the same number of input channels on the computer as output channels on the recorder can be expensive.

Further, where the events to be recorded are of a scientific or engineering kind and occur randomly at large intervals of time a sophisticated means of time identification is needed to identify the signals on different channels coming from the same source. For example, in monitoring explosions with multiple channel recording equipment and subsequently analyzing all data on all channels needs an accurate means of locating corresponding signals on each channel.

The invention can be used in numerous environments wherein the time of occurrence of an event may not be known, or wherein it may be too difficult to provide an accurate signal at the beginning of the event. Examples of such situations would include military situations wherein some event is under surveillance but the time at which it will occur is unknown. Another situation is in blasting wherein a remote monitoring station is provided, and it is too difficult or too dangerous to time the operation of the monitoring means into the circuitry of the blasting equipment itself. During the blasting, ground movement can be computed to ascertain possible damage to nearby buildings. Another application of the invention could be in seismic work, where the resultant wave form of the reflected wave caused by the explosion needs to be accurately produced.

Many prior art systems depend upon a timing pulse which occurs at the time of the firing of the explosive. This method is undesirable because it requires wiring into the firing circuit, radio transmission of start signals, cable runs, or the like. All of these problems are eliminated with the invention.

SUMMARY OF THE INVENTION

The present invention provides a system comprising a signal generator and a data synchronizer. This signal generator signal is made up of a large number of constant pulses which are input to the data synchronizer during recording. During said recording the data synchronizer provides a repetitive timing pulse after a predetermined number of these pulses. This signal from the data synchronizer is recorded simultaneously with the data, either on a separate channel, or overlaid on a data channel using standard techniques of separate frequency bands for the signal and data.

The same data synchronizer is later used during playback for analysis of the data, when it produces a single synchronizing pulse for initiation of the analyzing equipment via an external trigger. The system can operate with and is particularly adapted for use with a system wherein the data is recorded on a number of channels greater than the number of channels on which it is played back. Typically, the data would be recorded on more channels than the computer used for analysis has the ability to handle. For example, if the data were recorded on nine channels and the computer has the ability to analyze only two channels at a time, then the data would be played five times through the data synchronizer into the computer. The invention is directed towards providing a triggering pulse to initiate the computer action at the exact same time on each pass of the tape through the tape recorder. In this manner, the computer produces output results which would be the same as if the computer had the ability to analyze all nine channels simultaneously.

Thus, an important aspect of the invention is the provision of this triggering pulse at the precise time on each pass of the tape on playback in order to synchronize the data as analyzed on each such pass.

The invention performs this function by providing switch means to count the number of the relatively small signal generator pulses from the next proceeding data synchronizer timing pulse, and providing a triggering pulse to turn on the computer at exactly the same time on each pass of the tape on playback.

The tape recorder playback speed can be altered without affecting the operation of the data synchronizer in producing a triggering pulse.

BRIEF DESCRIPTION OF THE DRAWING

A preferred embodiment of the invention will now be described, with reference to the following drawing also forming a part of this disclosure, wherein:

FIG. 1 is a block diagram of the invention apparatus shown in the data recording format;

FIG. 2 is a similar block diagram showing the playback configuration;

FIG. 3 is an electrical block diagram of the power circuit;

FIG. 5 is a family of curves useful in explaining the manner of operation of the invention;

FIG. 6 is a partial simplified version of FIG. 4 useful to explain the record mode of the invention; and FIG. 7 is another family of curves similar to FIG. 5 useful in explaining the manner of operation of FIG. 6.

DETAILED DESCRIPTION OF THE PREFERRED EMBODIMENT

Referring now in detail to FIGS. 1 and 2, FIG. 1 shows the configuration of the equipment for recording, and FIG. 2 shows the configuration during playback.

Figure 4A:
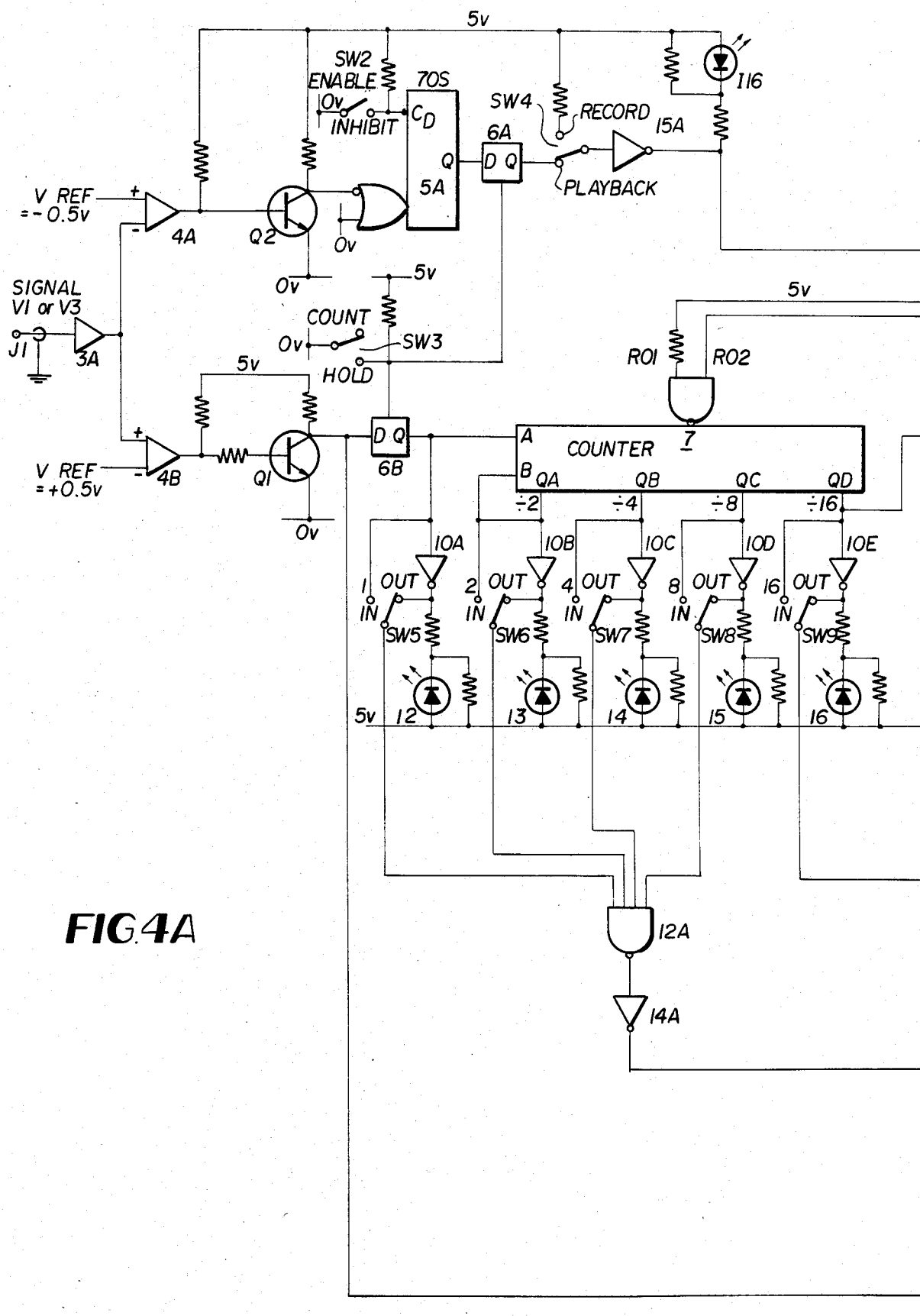
FIG. 4 is a detailed schematic of the apparatus of the invention.
Figure 4B:
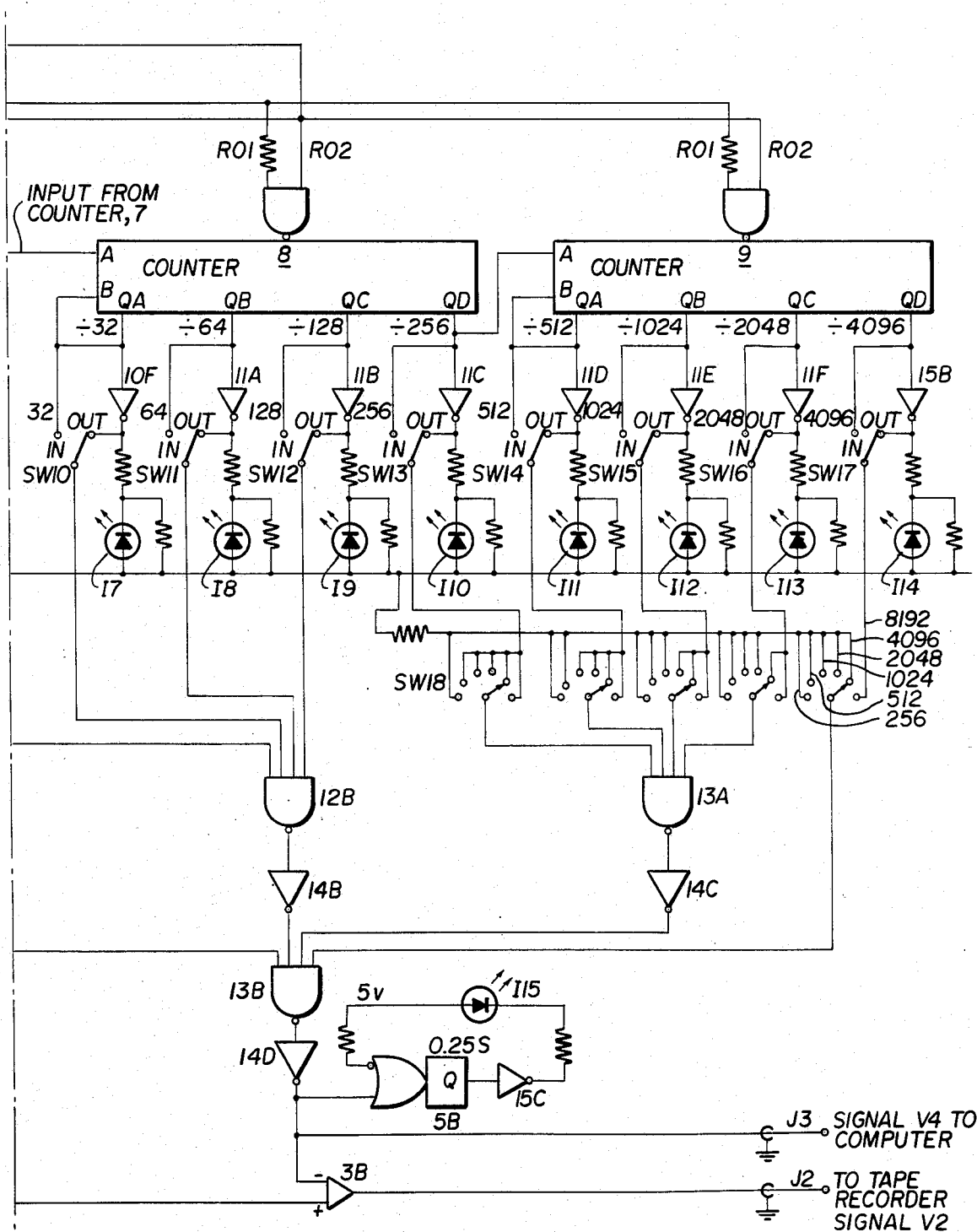

The same data synchronizer, called "D.S.", is used in FIGS. 1 and 2, and this element D.S. is shown in full detail in FIGS. 3 and 4.

During recording, a signal generator (S.G.) is utilized to provide a string of fiducial or constant pulses. These pulses are indicated in FIGS. 1, 4 and 5 as the signal V1. This signal V1 is at a frequency $f_i$. This frequency is determined based upon the desired delay resolution (see Δt' in FIG. 5) and the recording characteristics of the tape recorder (T.R.). The data synchronizer D.S. provides a three level digital signal for recording at voltage levels −1 V, 0 V and 1 V.

It should be noted that the data is entering on a plurality of channels, three are indicated by way of example. However, any number of data channels can be utilized depending upon the abilities of the tape recorder T.R.

FIG. 2 shows playback wherein the same tape recorder T.R. and data synchronizer D.S. are being used together with a computer system C.S.

According to the invention, the data synchronizer D.S. decodes the recorded three-level digital signal during playback and provides an output synchronizing pulse to externally trigger the computer system C.S. The pulse occurs at the same instant relative to the data recorded on each channel each time the tape is played back, and does so regardless of the playback speed.

The synchronizing pulse may be delayed time-wise in steps of Δt', given by:

$$\Delta t' = \frac{\text{Tape recording speed}}{\text{Tape playback speed}} \times \frac{1}{2f_i}$$

The required delay is easily determined by using the HOLD facility of the data synchronizer D.S. The location of the output synchronizing pulse on the tape is determined by a pre-analysis of the tape to determine a convenient reference point prior to the occurrence of a signal to be analyzed.

The pulse is TTL compatible and allows for easy interfacing with TTL compatible circuits, and for positive and negative edge triggering.

A depiction of the power circuit is shown in FIG. 3.

Typical parameter values for an engineering application monitoring ground vibrations caused by explosions were as follows:

Tape recording speed = 95.25 mm/s
$f_i$ = 40 Hz
Δt = 12.5 ms
N (sequence length) = 1024
T = NΔt = 12.8 s
Tape playback speed = 95.25 mm/s
Δt' = 12.5 ms Record Mode The required switch positions are as follows:
SW 1: ON
SW 3: COUNT
SW 4: RECORD
SW 5: OUT
SW 18: desired SEQUENCE LENGTH, N Referring now to FIGS. 4 and 5, the signal generator S.G. is used to feed a square wave V1 of frequency $f_i$ and voltage levels 0, 1 V into the record input connector terminal J1. The unity gain buffer 3A presents this input signal to comparator 4B. The output from 4B is inverted and converted to TTL levels by transistor Q1. The Q output of the latch 6B follows its data input D, and drives the binary counter 7 which gives divide by 2, by 4, by 8 and by 16 outputs. The divide by 16 output drives the binary counter 8 which gives divide by 32, by 64, by 128 and by 256 outputs. The divide by 256 output drives the binary counter 9 which gives divide by 512, by 1024, by 2048 and by 4096 outputs.

All of these outputs from the three binary counters and the output from latch 6B are inverted by buffers 10A to 10F, 11A to 11F and 15B. These buffered outputs drive indicators I2 to I14 which show the state of the counters.

Switches SW 5 to SW 17 determine which signals are fed into the NAND gates 12A, 12B, 13A and 13B. These NAND gates and the inverters 14A to 14D are equivalent to a 13-input AND gate, whose net effect is to produce a pulse at the output of 14D once every time T, as determined by switch SW 18. This output is subtracted from the output of Q1, by amplifier 3B, and the resulting signal is made available for recording at connector terminal J2.

Every time 14D pulses, monostable 5B is triggered and lights up indicator 15 for about 0.25 seconds via buffer 15C.

Signal V2 shows the negative going timing pulses, which occur with a period of NΔt, overlaid on the signal V1. V3 shows the signal V2 as it appears during playback. V4 is the trigger or synchronization pulse to the computer system C.S. The last curve in FIG. 5 is the event or signal of interest itself.

Simplified Explanation of Record Mode

This explanation of the record mode is illustrated by FIGS. 6 and 7. FIG. 6 shows a simplification of and only those parts of FIG. 4 necessary to explain the recording operation.

In FIG. 4, the input V1 (positive pulses) is at J1, which is shown in FIG. 6. In FIG. 4, the positive pulses applied to J1 are blocked by 4A and so the signal path 4A—Q2—5A—6A has been deleted from FIG. 6.

In FIG. 4, SW4 (RECORD position) enables counters 7, 8 and 9 via reset gate inputs R02. This enabling circuitry is deleted from FIG. 6 and the counter shown is assumed to be enabled. In FIG. 4, positive pulses (VI) applied at J1 produce positive pulses (of different voltage levels) as the output of 4B, and so 3A and 4B have been deleted from FIG. 6. In FIG. 4, with SW3 in COUNT position, 6B passes the signal from Q1 to 7 unaltered and so SW3 and 6B have been deleted from FIG. 6.

In FIG. 4, SW5 must be in OUT position (record mode) and so 10A (inverter) is shown in FIG. 6. In FIG. 4, the counters 7, 8 and 9 (total 12 outputs) and their associated inverters, gates, switches and indicators have been replaced, for simplicity in FIG. 6, by a 2-output counter and a 3-input AND gate. In FIG. 4, the differencing amplifier 3B is shown in FIG. 6 as the final stage with output V2 at J2.

FIG. 7 shows the waveforms associated with FIG. 6.

The input positive train of constant pulses, V1, is inverted by Q1 to produce S1. S1 is applied at input A of the 2-bit binary counter which produces the divide-by-2 output QA and the divide-by-4 output QB, shown as S3 and S4, respectively. S1 is also inverted by the SW5 inverter to produce S2. S2, S3 and S4 are fed into the AND gate which outputs S5. The differencing amplifier subtracts S5 from S1 to produce the output V2 at J2.

V2 has a negative pulse once every 8Δt. If all 12 counter outputs of FIG. 4 were utilized (SW18 in the 8192 position), V2 would have a negative pulse once every 8192Δt.

Playback Mode

The required switch positions are as follows:
SW 1: ON
SW 2: closed (INHIBIT) resets counters unless SW 3 is closed (HOLD)
  open (ENABLE) allows counting to commence when negative pulse appears at terminal J1

SW 3: open (COUNT) allows counting
  closed (HOLD) stops counting and holds counted value
SW 4: contacts 6A (PLAYBACK)
SW 5–SW7: desired DELAY
SW 18: equal to N or a larger setting The recorded waveform V3 is played back into connector terminal J1. This is a three level digital signal with voltage levels −1 V, 0 V and 1 V. The unity gain buffer 3A presents this signal to comparator 4A, which produces a positive pulse output every time a negative pulse occurs at J1. This happens at intervals of time T'.

The output from 4A is inverted and converted to TTL levels by transistor Q2, which controls the triggering of monostable 5A. The monostable 5A is triggered by negative going edges and hence produces an output pulse every time the leading edge of a negative pulse appears at J1. The monostable may be inhibited by switch SW 2 (when closed), which consequently controls which negative pulse at J1 produces a monostable pulse. This pulse is high for about 70 seconds, which after being inverted by buffer 15A enables the binary counters 7, 8 and 9 to count. This counting mode is indicated by indicator I16.

Enabling the latch 6A during a monostable pulse ensures that the binary counters are not reset, which would otherwise happen at the end of the pulse.

Because switch SW 3 enables latches 6A and 6B, at any instant it may be used to stop the counting and indicate the count value by means of indicators I2 to I14. Hence, during the preliminary playback, SW 3 is closed and put into HOLD at the required instant and then SW 5 to SW 17 are placed in the IN position if the corresponding indicators are lit. This playback may be done at a slow speed to make the process easier. Desirable small changes in the delay may be determined experimentally.

Switch SW 2 is opened and put into ENABLE at anytime between the negative pulse at J1 which is required to start the counting, and the previous negative pulse. Closing of SW 2 and putting it into INHIBIT immediately resets the binary counters, provided that SW 3 is in the open (COUNT) position.

The rest of the circuit operates as described under RECORD MODE, which produces an output pulse at connector J3 after the desired delay as determined by switches SW 5 to SW 17.

Using this technique, for example, two data channels are stored in the digital computer system, and then the process is repeated to store the third data channel, thus maintaining time fidelity between the signals. Obviously, this technique can be extended to include all channels of the tape recorder.

OPERATION

Overall, the problem to which the invention is directed has to do with proper synchronization among traces or data channels. For example, assume that the data is coming in on nine channels but that the computer C.S. of FIG. 2 can only analyze two channels at a time. After the tape has been recorded, and it may have run for many hours to record only a few seconds of data, the analysis would begin with first doing a "rough pass" to find out roughly the location of the data of interest. After this is found, the tape is run through the FIG. 2 version of the apparatus using the data synchronization and the first two traces are stored and analyzed. Now the invention comes into play to create timing pulses which will permit the third through ninth traces to be analyzed exactly in synchronization with the first two traces. Thus, the effect is to produce a final output from a computer C.S. having the ability to analyze only two traces as if it had the ability to handle all nine traces at once.

The chain of similar pulses V1 are produced by the signal generator. V2 is this chain with the D.S. timing pulses overlaid as shown. In FIG. 5 the event curve has been added at the bottom of the drawing. The invention provides the triggering pulse V4 consistently on each subsequent pass of the tape through the recorder T.R. in order to activate the computer using the pulse V4. This is done by counting the time between any particular D.S. timing pulse to the event time, this time period is called $M\Delta t'$. This is the time from the timing pulse to the event and corresponds to the time when the V4 trigger pulse is produced. By producing this trigger pulse consistently from one trace to the next all of the traces or data channels can be analyzed as if they were analyzed simultaneously.

The trigger pulse V4 actually activates the computer. The computer idles or is inoperative unless it gets the V4 triggering pulse on each succeeding play forward of the tape. This is an advantage of the invention in that it maximizes efficiency of use of the computer C.S. or other analyzer.

Referring to FIG. 5, there is a small space on the event curve between the triggering pulse before and the actual beginning of the event in order for the computer to have a zero reference signal. This is indicated by the vertical dashed line.

Referring to FIG. 1, the signal pulses V2 can be put on its own channel, or if there aren't sufficient data channels, then this signal can be overlaid on one of the data channels. In that case a filter arrangement will be required to separate out the V2 signal to produce the V3 signal during playback. That kind of frequency separation is ordinary in the art.

Referring to FIG. 4, when V1 is input at terminal J1, all of this signal goes through Q1 because that part of the circuit is designed to accept the positive V1 pulses. When V3 is input at terminal J1, the negative D.S. pulses as shown in FIG. 5 are routed through Q2, the upper part of the circuit.

During the setting up of the D.S. for playback, the tape is slowed down if necessary, and in the interval between two D.S. timing pulses before the event occurs, the enable switch SW2 is thrown. This sets the circuitry components so that the next D.S. negative going pulse will commence counting of the distance $M\Delta t'$ between that D.S. pulse and the beginning of the event. Once the "rough pass" is made, the switches SW5 through SW17 can be set. The lights associated with each of the switches will reveal what that count is, that is the actual number of S.G. positive pulses of duration $\Delta t'$ that occur in the interval $M\Delta t'$.

Operation of Switches

FIG. 3 is the power supply for the data processor shown in FIG. 4.

SW1 is the main power switch of the D.S.

SW2 is used during Playback mode.

SW2 is left in INHIBIT position until the desired pre-event interval occurs, when it is put into the ENABLE position to allow counting to occur and an output pulse when the preset number of counts (set by SW5 to SW17) has been reached.

SW3. During RECORD—put in COUNT position to allow correct operation.

During PLAYBACK:

(a) During initial determination of synchronizing pulse output: Put in COUNT during pre-event interval, and when event occurs put into HOLD. This will show counted value via indicators I2 to I14. SW5 to SW17 should be put into IN position corresponding to indicators (I2 to I14).

(b) Leave in COUNT position for operation to give computer trigger.

SW4 Determines operating mode of D.S.:

RECORD. All counters enabled.

PLAYBACK: All counters enabled when monostable 5A fires to give positive pulse (about 70 s long)

SW5-SW17 PLAYBACK:

Determines number of counts M, see SW3 explanation.

RECORD:

Only SW5 used: must be in OUT position to give correct phase to 14D output, so that when 14D output is subtracted from Q1 output, obtain proper output at J2.

SW18

RECORD mode:

Determines sequence length N from one timing pulse to next, see V2 in FIG. 5.

(a) Position 8192: all outputs of binary counters included, so N=8192.

(b) Position 4096: $Q_D$ output of binary counter 9 deleted, so have ½ seq. length of (a) above and N=4096 etc. to (c) Position 256.

PLAYBACK

Must be able to count to maximum value set in RECORD mode, i.e., equal to or more than N.

It may thus always be set to $N_{max}=8192$ with safety.

While the invention has been described in detail above, it is to be understood that this detailed description is by way of example only, and the protection granted is to be limited only within the spirit of the invention and the scope of the following claims.

I claim:

1. A method of analyzing data containing an event of interest wherein the data is recorded on a first number of channels and is then played back for analysis using a computer system having the ability to accept a second number of channels, and wherein said computer system second number of channels is smaller than said first number of recording channels, comprising the steps of producing a recording signal having a constant frequency of pulses, overlaying timing pulses on said recording signal at a predetermined multiple of said recording pulses, simultaneously recording the data to be analyzed with said recording and timing pulses, determining the location of the event of interest in the data including determining the number of said recording pulses from the timing pulse next preceding the recorded event of interest in the data to the beginning of said event of interest in the data, playing said recorded data into said computer system sufficient times that all of the recorded channels are analyzed by said computer system, and producing a triggering pulse to activate said computer system on each successive playback of said data at the same instant during each said playback, whereby the output analysis from said computer system is equivalent to that which would be produced if said computer system had the ability to analyze all of said larger number of recording channels simultaneously.

2. The method of claim 1, wherein the data is recorded at a speed different from the speeds at which the data is analyzed.

3. The method of claim 1, wherein said timing pulses, said triggering pulses, and said recording pulses are all square waves.

4. The method of claim 1, wherein said data is recorded on nine channels and said computer system has the ability to analyze a maximum of two channels at one time.

5. The method of claim 1, wherein said event of interest is of relatively short time duration, wherein the time of occurrence of said event of interest in real time is unknown and wherein the recording of said data takes place over a relatively long period of real time in order to assure recording of the event of interest, and the step of activating said computer system only after said triggering pulses occur so that said computer system is operative during the successive playbacks of said data only during playback of the event of interest, whereby efficiency of utilization of said computer system is maximized.

6. The method of claim 1, and the steps of making one of said recording pulses and timing pulses negative and making the other one of said pulses positive, and using circuit means responsive to respective negative and positive going pulses in performing said determining steps.

7. The method of claim 1, wherein said triggering pulse is generated at the beginning of said event therein.

8. A system for recording and analyzing data containing an event of interest comprising data recording means having a first number of recording channels, a data analyzer having a second number of channels, said second number of analyzer channels being smaller than said first number of recording channels, means to produce a stream of recording pulses of constant frequency, means to produce timing pulses at a constant multiple of said recording pulses, means to determine the location of the event of interest in the data including determining the number of recording pulses from a timing pulse next preceding the event of interest until the start of the event of interest, and means to produce a triggering pulse adopted to activate said data analyzer at the start of said event, whereby the final output of said data analyzer is equivalent to that which would be produced if said data analyzer were able to analyze all of said first number of recording channels at the same time.

9. The system of claim 8, and said data analyzer comprising a computer.

10. The system of claim 8, said means to produce said timing pulses and said triggering pulses comprising a data synchronizer, and means to use said data synchronizer with both said data recording means in recording means and with said data analyzer in analysis mode.

11. The system of claim 8, and means to cause said timing, recording and triggering pulses all to have a square wave configuration.

12. The system of claim 8, wherein said first number is at least three and said second number is at least two.

13. The system of claim 8, wherein said event of interest is of relatively short time duration, wherein the time of occurrence of said event of interest in real time is unknown and wherein the recording of said data takes place over a relatively long period of real time in order to assure recording of the event of interest, and means for activating said data analyzer only after said triggering pulses occur so that said data analyzer is operative during the successive playbacks of said data only during playback of the event of interest, whereby efficiency of utilization of said data analyzer is maximized.

14. The system of claim 8, means to make said recording pulses either positive or negative going and said timing pulses of the opposite sense, and said means to determine including circuit means responsive to the respective negative and positive going characters of said pulses.

* * * * *